US007079632B2

(12) United States Patent
Fellenstein et al.

(10) Patent No.: US 7,079,632 B2
(45) Date of Patent: Jul. 18, 2006

(54) VOICE MAIL PROFILES FOR DYNAMIC VOICE MAIL RESPONSE

(75) Inventors: Craig William Fellenstein, Brookfield, CT (US); Carl Phillip Gusler, Austin, TX (US); Rick A. Hamilton, II, Charlottesville, VA (US); James Wesley Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 216 days.

(21) Appl. No.: 10/650,909

(22) Filed: Aug. 28, 2003

(65) Prior Publication Data

US 2005/0047563 A1 Mar. 3, 2005

(51) Int. Cl.
*H04M 1/64* (2006.01)
(52) U.S. Cl. .................... 379/88.22; 379/88.16
(58) Field of Classification Search .......... 379/67.1, 379/68, 69, 70, 74, 77, 84, 88.16, 88.17, 379/88.18, 88.22, 88.23, 88.24, 88.25
See application file for complete search history.

(56) References Cited

U.S. PATENT DOCUMENTS

| | | | |
|---|---|---|---|
| 5,675,631 A | 10/1997 | Kaminsky et al. | 379/67.1 |
| 5,917,893 A | 6/1999 | Katz | 379/93.02 |
| 5,974,120 A | 10/1999 | Katz | 379/93.13 |
| 6,088,428 A | 7/2000 | Trandal et al. | 379/88.92 |
| 6,167,255 A | 12/2000 | Kennedy, III et al. | 455/414.1 |
| 6,240,391 B1 | 5/2001 | Ball et al. | 704/270 |
| 6,243,443 B1 | 6/2001 | Low et al. | 379/88.17 |
| 6,246,758 B1 | 6/2001 | Low et al. | 379/230 |
| 6,282,281 B1 | 8/2001 | Low | 379/230 |
| 6,289,165 B1 | 9/2001 | Abecassis | 386/46 |
| 6,295,447 B1 * | 9/2001 | Reichelt et al. | 455/417 |
| 6,335,962 B1 | 1/2002 | Ali et al. | 379/88.11 |
| 6,345,288 B1 | 2/2002 | Reed et al. | 709/201 |
| 6,374,102 B1 | 4/2002 | Brachman et al. | 455/422.1 |
| 6,405,033 B1 | 6/2002 | Kennedy, III et al. | 455/404 |
| 6,449,342 B1 * | 9/2002 | Johanson | 379/88.11 |
| 6,453,164 B1 * | 9/2002 | Fuller et al. | 455/445 |
| 6,792,082 B1 * | 9/2004 | Levine | 379/67.1 |

(Continued)

FOREIGN PATENT DOCUMENTS

EP 1 056 267 A3 7/2001

(Continued)

OTHER PUBLICATIONS

U.S. Appl. No. 10/383,851, filed Mar. 6, 2003, Fellenstein et al.

(Continued)

*Primary Examiner*—Ovidio Escalante
(74) *Attorney, Agent, or Firm*—Diana L. Roberts-Gerhardt; Joseph P. Lolly; Anthony V. S. England (57) ABSTRACT

A voice mail system includes a call processing unit to receive incoming calls and access requests, a data storage unit to store digital representations of audio messages on a storage medium, and an administrative unit to enable a user to define a voice mail profile. The profile includes a set of voice mail conditions and a corresponding set of conditional actions. Each condition specifies at least one characteristic of an incoming call or system access request. The voice mail system processes a system access request or incoming call by determining whether at least one of the voice mail conditions is satisfied and, if so, responding to the system access request or incoming call according to the corresponding conditional action.

16 Claims, 5 Drawing Sheets

U.S. PATENT DOCUMENTS

2002/0090067 A1    7/2002   Forrest .................... 379/88.12

FOREIGN PATENT DOCUMENTS

WO        WO 02/17650  A1     2/2002
WO        WO 02/19082  A2     3/2002

OTHER PUBLICATIONS

U.S. Appl. No. 10/671,250, filed Sep. 25, 2003, Fellenstein et al.

U.S. Appl. No. 10/156,781, filed May 24, 2002, Fellenstein et al.

* cited by examiner

VOICE MAIL PROFILES FOR DYNAMIC VOICE MAIL RESPONSE

BACKGROUND

1. Field of the Present Invention

The present invention is in the field of audio communication systems and more particularly in the field of telephone voice mail systems.

2. History of Related Art

Voice mail systems refer generally to any system designed to perform telephone call answering and message handling services. Voice mail systems have proliferated and evolved since their first introduction to offer many convenient and useful features. Voice mail is now a significant reality for a large percentage of busy professionals. Almost all voice mail systems offer users the ability to record a personalized voice message, listen to voice mail messages from a remote location, save messages, reply to messages, forward messages to one or more other mailboxes in the system with or without introductory messages, define and use mailbox groups, and review saved messages. In addition, many systems offer users the ability to forward incoming calls directly to a specified voice mail box or forward incoming calls to another phone number. While all of these features and more are available on voice mail systems, each of them is typically activated on an ad hoc basis in response to user commands that are submitted by entering a sequence of telephone keypad digits or voice requests in response to a voice-based command menu. Thus, the behavior of the voice mail system is static in the sense that a user must "manually" provide the desired commands to activate specific features each time the voice mail system is accessed. In contrast to this static model, the voice mail needs and practices of many users are dynamic and, to some extent, predictable. A user is likely to use voice mail systems in different ways depending upon other circumstances. The time of day, for example, may correlate well to the manner in which users access their voice mail systems. During certain hours when the number of voice messages is high and other activities are going on, a user may wish to access the voice mail system in the manner that is highly efficient or quick. At other times when there is likely to be less external activity, such as during lunch or after regular business hours, the user may have more time to review messages. Moreover, the time of day is but an example of a parameter that may include or correlate to the voice mail patterns of one or more users. Other parameters may also provide useful guidance to the way the voice mail system is used. It would be desirable to implement a voice mail system in which the parameters that are likely to have a significant bearing on the manner in which a voice mail system are captured in a user definable profile that governs the behavior of the voice mail system in handling incoming calls and user requests.

SUMMARY OF THE INVENTION

The goal identified above is achieved according to the present invention by a voice mail system that includes a call processing unit to receive incoming calls and access requests, a data storage unit to store digital representations of audio messages on a storage medium, and an administrative unit to enable a user to define one or more voice mail profiles. Each profile includes a set of voice mail conditions and a corresponding set of conditional actions. Each condition specifies at least one characteristic of an incoming call or system access request. The voice mail system processes a system access request or incoming call by selecting one of the profiles, determining whether at least one of the voice mail conditions specified in the selected profile is satisfied and, if so, responding to the system access request or incoming call according to the corresponding conditional action.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the present invention contemplates a voice mail system and method in which voice mail profiles are employed to enable a user to define the behavior of his/her voice mail system depending on certain definable parameters. The voice mail profiles enable a user to specify the manner in which calls are handled and messages are accessed according to, as examples, the time of day, day of week, and/or origin of the incoming call. By providing voice mail profiles, the present invention improves the flexibility and utility of conventional voice mail systems. The profiles produce a voice mail system with dynamic call answering and messaging handling capabilities that are customized to each user's behavior.

Figure 1:
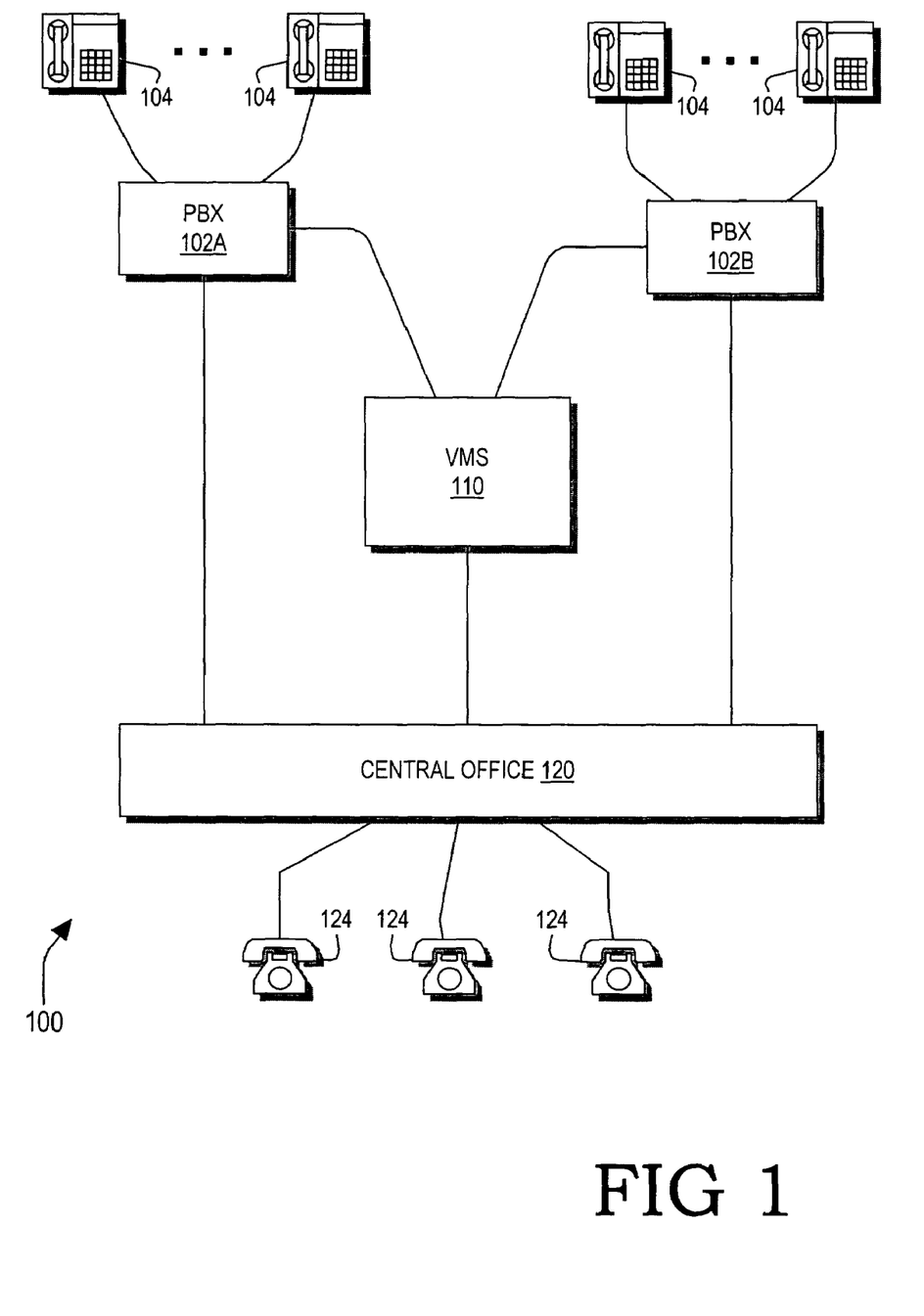
FIG. 1 is a block diagram of selected elements of a phone system according to one embodiment of the invention.

Referring now to FIG. 1, selected elements of a telephone system 100 implementing one embodiment of the present invention are depicted. In the depicted embodiment, system 100 includes multiple public branch exchanges (PBX's) 102A and 102B (generically or collectively referred to as PBX(s) 102) that are each connected to a corresponding set of telephones 104. Each PBX 102 represents a telephone switching network to connect the telephones of a private telephone system to a public telephone system. Each PBX 102 may represent, for example, an office of a corporation.

The set of phones 104 connected to PBX's 102 are referred to as being part of the voice mail system (VMS) 110 to which each PBX 102 is connected. Also shown are a set of external phone sets 124 connected to VMS 110 and to PBX's 102 through a public telephone central office 120. VMS 110 provides call answering services for incoming calls from external phones 124. In addition, VMS 110 provides message handling services for its internal users.

Figure 2:
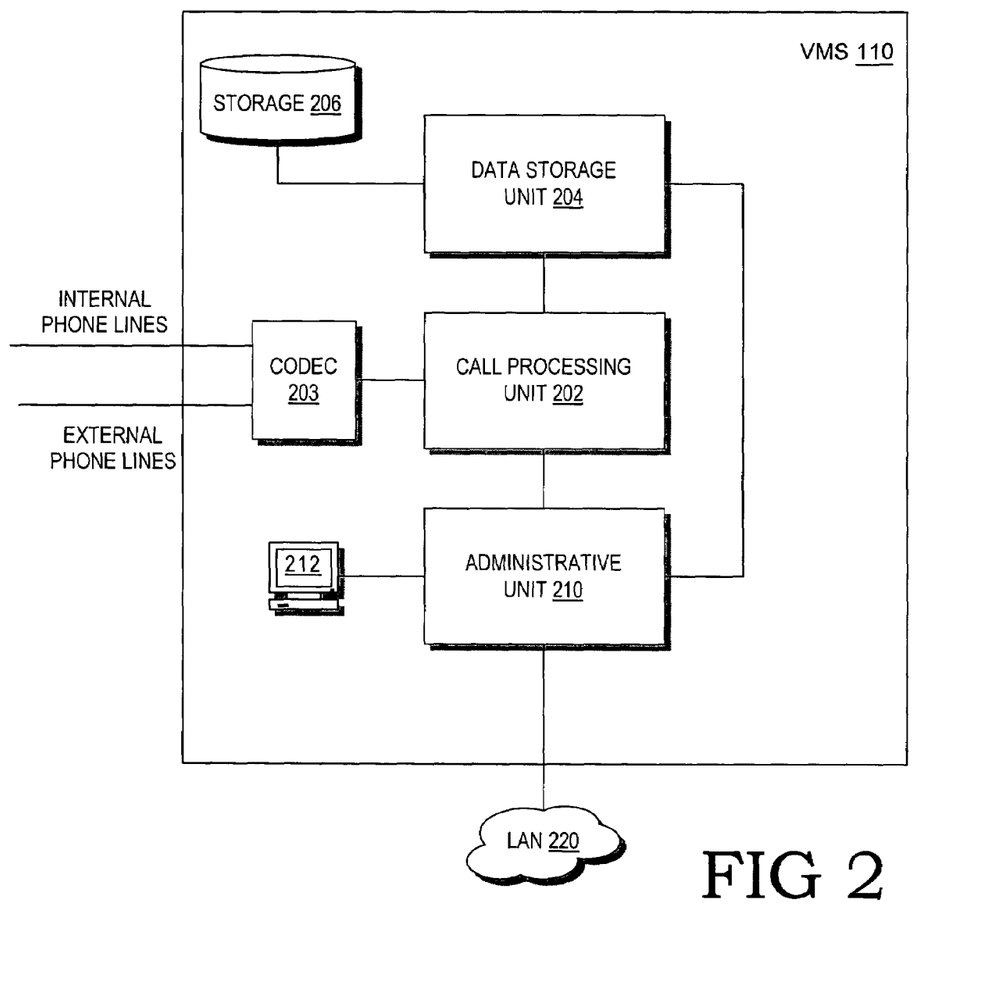
FIG. 2 is a block diagram of selected elements of a voice mail system according to one embodiment of the present invention.

Referring now to FIG. 2, selected elements of VMS 110 are presented. In the depicted embodiment, VMS 110 includes a call processing unit 202, a data storage unit 204, non-volatile or disk storage 206, and an administrative unit 210. In the depicted embodiment, call processing unit 202 is connected to internal and external phone lines through a coder/decoder (CODEC) 203. CODEC 203 transforms analog voice signals to digital equivalents thereof and vice versa so that analog voice signals from a telephone are converted to digital signals and digital signals from call processing unit 202 are converted to analog before being sent to a telephone. In other embodiments (not shown), the internal phones 124 may produce digital signals that do not require coding so that phone lines from internal phones 124 may connect directly to call processing unit 202.

Call processing unit 202 handles at least three functions of VMS 110, namely, system access, message deposit, and message retrieval. System access refers to an internal user of VMS 110 accessing the voice mail system to manage the user's messages and/or configure the user's mail box. Call answering refers to the process by which incoming messages are stored within VMS 110, and message retrieval or delivery refers to retrieving stored messages from disk storage 206 and playing the message back for the user.

Call processing unit 202 may respond to an incoming telephone call by first answering the phone, playing a predetermined or previously recorded message for the caller, recording the caller's message, and storing the recorded message in a appropriate storage medium for subsequent retrieval by the person to whom the message was directed. Call processing unit 202 typically invokes the features of administrative unit 210 and data storage unit 204 to achieve its objectives. As an example, call processing unit 202 may, in response to an incoming call, determine that it is time to store a message within disk storage 206. To achieve this result, call processing unit 202 may send a request for storage allocation to administrative unit 210, which responds by allocating a portion of disk storage 206 for the message and informing call processing unit 202 of the address of the allocated portion. In other situations, call processing unit 202 may access disk storage 206 directly though data storage unit 204 such as when call processing unit 202 needs a previously recorded or "canned" message for playing back to the user or caller.

Administrative unit 210 is shown as being attached to a local area network 220 and to a computer 212, which includes a keyboard and display screen. Computer 212 provides an administrator of VMS 110 permission to configure the entire system 110 to a known state following a power out or other reset event. In conjunction with one embodiment of the present invention, computer 212 may also implement a graphical interface and a corresponding utility to enable users of the voice mail system to define and use voice mail profiles. In another embodiment, the voice mail profile features, as described further below, are accessible to and definable by individual users over LAN 220. In one embodiment, for example, LAN 220 enables all properly authorized users on the LAN to access the user profile features of the invention via a standardized utility such as a conventional web browser. Data storage unit 204, as its name suggests, includes appropriate adapters and/or firmware and software to enable access to the disk storage 206 to store and retrieve digital representations of audio messages.

Figure 3:
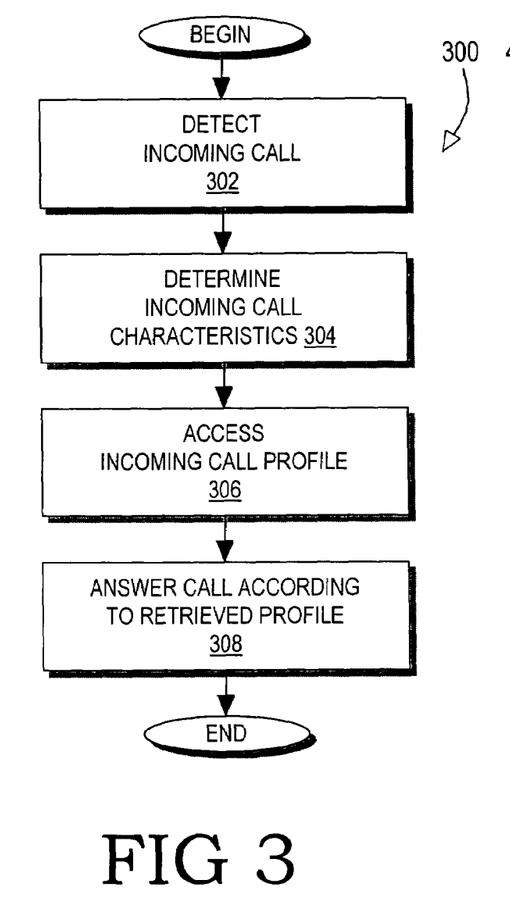
FIG. 3 is a flow diagram of a call handling method according to one embodiment of the present invention.
Figure 4:
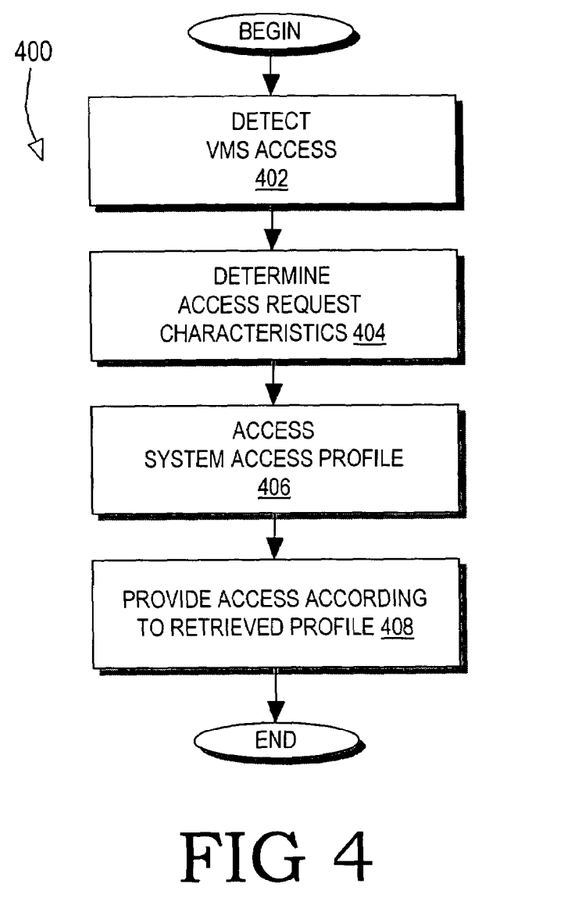
FIG. 4 is a flow diagram of a messaging access method according to one embodiment of the present invention.

Portions of the present invention may be implemented as a set of computer executable instructions stored on a computer readable medium (software). The instructions, when executed, enable the executing computer to perform a particular task or process. Referring now to FIG. 3 and FIG. 4, flow diagrams illustrating methods of handling incoming calls (FIG. 3) and system access requests (FIG. 4) are shown to emphasize selected features of the present invention. The segregation of the incoming call handling method of FIG. 3 and the system access request handling method of FIG. 4 is intended to clarify distinctions between the two methods, but is not intended to imply, for example, that the incoming call profile referred to in FIG. 3 and the system access request profile of FIG. 4 are distinct entities. Portions of the methods 300 and 400 may overlap and/or coexist and the respective profiles may overlap.

Turning now to FIG. 3, a flow diagram of a process or method 300 of answering and handling incoming calls according to one embodiment of the present invention is depicted. In the depicted embodiment, an incoming call is detected (block 302) by call processing unit 202 of VMS 110. After the incoming call is detected, call processing unit 202 determines (block 304) certain characteristics or parameter values. The determined characteristics or parameters include parameters associated with the incoming call itself such as the originating area code or phone number as well as "environmental" parameters such as the time of day or day of week. VMS 110 also selects and retrieves or otherwise accesses (block 306) an incoming call profile that is indicative of the manner in which the corresponding user prefers to answer incoming calls. Based on the selected incoming call profile, VMS 110 then answers (block 308) the call based on the profile retrieved. In one embodiment, the incoming call parameters that, in conjunction with the incoming call profile, determine the method of handling the incoming call may include, just as examples, the time of day, day of week, originating phone number, or a combination thereof. The call answering options may include, to illustrate, forwarding the call directly to a voice mail box, forwarding the call to another phone number, or ringing the call through to the appropriate internal telephone.

Referring to FIG. 4, a flow diagram analogous to the one of FIG. 3 illustrates a method 400 of handling user requests to the voice system. Initially, the VMS system 110 detects (block 402) a user's request to access the system. The system then identifies (block 404) predetermined characteristics of the access request such as, for example, the time of day, day of week, and/or originating telephone number or area code. A system access profile is selected and accessed in block 406 and used in conjunction with the determined access request characteristics to provide access (block 408) to the voice mail system as specified in the profile. The selected access profile may, for example, specify that messages are to be played backed in a summary mode (by playing the first several seconds only of a message) if the system access request is initiated from an external phone or is initiated before a specified time in the morning.

Figure 5:
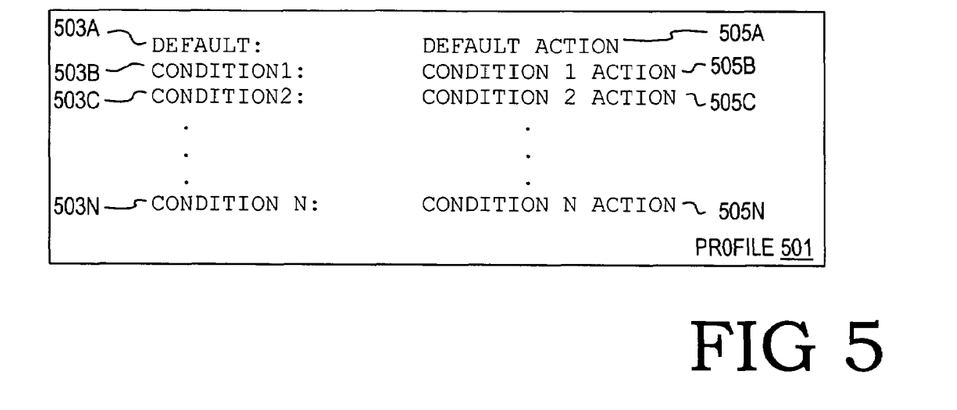
FIG. 5 is a conceptual depiction of a voice mail profile according to one embodiment of the invention.

Turning now to FIG. 5, a conceptual depiction of a profile 501 according to one embodiment of the present invention is depicted. Profile 501 is representative of one of multiple profiles each user may define and employ. In the depicted embodiment, profile 501 includes a list of conditions 503A through 503N and a corresponding set of actions or responses 505A through 505N. Profile 501 defines the voice mail system behavior for various scenarios of system access requests and incoming calls. The conditions 503 correspond to characteristics associated with each incoming call or system access request. Each incoming call and system access request may be characterized by a set of voice mail parameters including, as examples, the time of day, day of week, week of month, etc., the originating telephone number, and so forth. Each profile 501 includes a conditional action 505 corresponding to each condition 503. In one embodiment, the conditional action 505 determines the manner in which VMS 110 performs specified tasks when profile 501 is the currently selected or "active" profile and the condition 503 corresponding to action 505 is satisfied.

In the depicted embodiment, profile 501 is an ordered sequence of logical conditions 503 and their corresponding actions 505. The first line 503A of profile 501 represents a default condition that applies when none of the other specified conditions is satisfied. Each subsequent access condition 503B through 503N represents a Boolean expression with certain predefined variables being candidates for the Boolean expression variables. Thus, each entry in profile 501 is of the form "IF <CONDITION (503)> THEN <ACTION (505)>, where <CONDITION> is selected from a set of conditions VMS 110 is capable of monitoring and <ACTION> is selected from a set of actions VMS 110 is capable of performing.

In one embodiment, every user or mail box of the voice mail system has at least one profile 501. The set of profiles 501 are stored on disk storage 206 of FIG. 2. Portions of profiles 501 may also reside in memory or storage elements of call processing unit 202 and/or administrative unit 210 of VMS 110 as depicted in FIG. 2. The embodiment of profile 501 depicted in FIG. 5 is suitable for use in a single profile implementation. In this implementation, a single profile is sufficient to fully define the desired behavior of VMS 110 for the corresponding user or mail box because the conditions 501 may be strung together in a logical chain capable of defining all definable contingencies and voice mail parameters. In the single profile implementation, as illustrated with respect to FIGS. 6A and 6B, each incoming call or system access request associated with a particular user or mail box causes call processing unit 202 to evaluate each of the defined conditions 503 in the profile 501 corresponding to the user or mail box. In one embodiment, voice mail system behavior or options are determined by the last condition in the list of conditions 503 that is satisfied. Thus, for example, if condition 503A and 503B are satisfied at the time of a particular incoming call or system access request while none of the other conditions are satisfied, condition 503B trumps condition 503A and the action 505B corresponding to condition 503B determines the system behavior. This embodiment provides a simple method of prioritizing the defined conditions by the ordering of the conditions in the profile 501. The utility of this implementation is strengthened if call processing units support compound conditions. Condition N (503N) of profile 501, for example, might be the logical AND of Condition A 503A and Condition B 503B. Under this profile, if condition A and condition B were both satisfied, the action 505N corresponding to condition N would dictate the action taken by the voice mail system.

Other embodiments of the invention may employ multiple profiles 501 for a user or mail box. In such implementation, a user may define various profiles for use during different periods. A user may, for example, define a "vacation" profile, a "travelling" profile, an "in-town" profile, and a "convention" profile. The vacation profile, as suggested by its name, would be selected or activated by the user when the user is on vacation and so forth for the remainder of the profiles. In another implementation of a multiple profile embodiment, the call processing unit of the voice mail system would select the profile at the time of handling an access request or incoming call. In one such implementation, a user could define a "Monday" profile, a "Tuesday" profile, and so forth, where the call processing unit selects the appropriate based on the day of the week. This embodiment might be beneficial in breaking down a complex profile capable of handling all parameters into manageable smaller profiles. In still another embodiment, the user selected and machine selected profiles may be combined such that, for example, a user specifies a machine selected "weekday" profile and "weekend" profile for each of the user selectable profiles "vacation", "travelling", "in-town", and "convention."

Figure 6A:
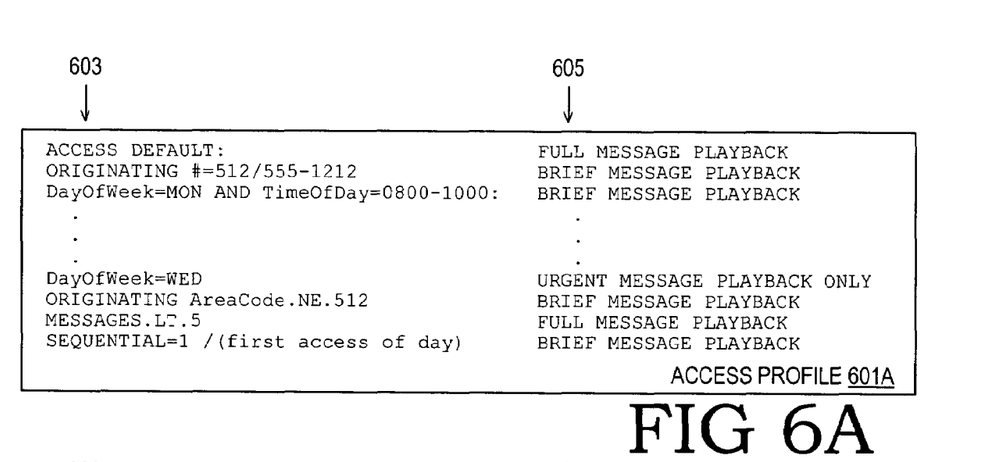
FIG. 6A and FIG. 6B are conceptual illustrations of embodiments of an exemplary system access request profile and incoming call profile respectively.
Figure 6B:
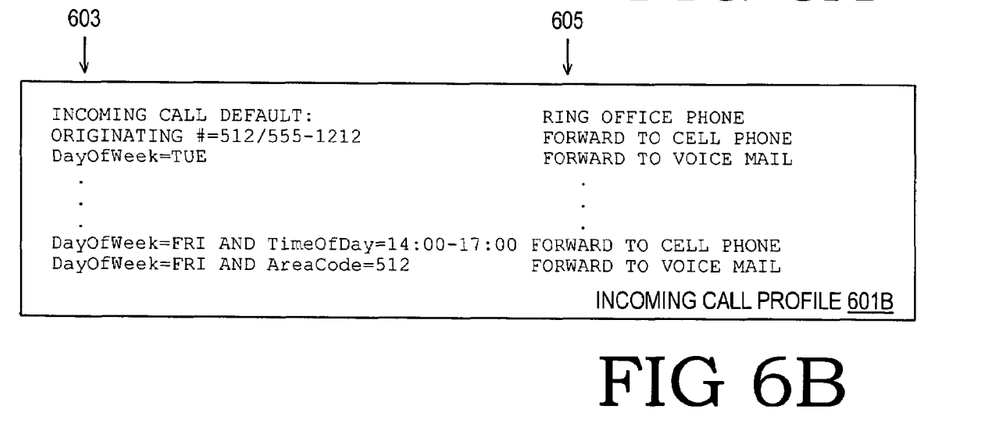

In one embodiment, VMS 110 employs, for each user or mail box, a first profile for defining voice mail system behavior in response to a system access request (the access request profile) and a second profile defining voice mail system behavior in response to an incoming call (the incoming call profile). While these profiles are conceptually distinct, it will be appreciated that a complete profile defines voice mail system behavior in response to system access requests and incoming calls both. Thus, a complete user profile includes an access request profile and an incoming call profile and the two may be contained within a single file or other entity of the system's storage. An exemplary access request profile 601A and incoming call profile 601B are illustrated in FIGS. 6A and 6B respectively. Each of the profiles 601A and 601B includes a list 603 of conditions (including a default condition) and a corresponding list 605 of actions defining the behavior of VMS 110 when the respective conditions are satisfied. The conditions/actions specified in profiles 601A and 601B are observed when the corresponding profile is selected or activated.

For the system access request profile 601A, the choice for conditions include the time of day, the day of week, the originating phone number (i.e., is the user accessing voice mail from home, cell phone, out of town), a message count parameter indicating the number of new messages in the mail box, and a sequence parameter corresponding to the number of times the system has been accessed in the calendar day. The corresponding set of actions includes the various message playback options provided by the system. In the depicted embodiment, the VMS 110 includes a brief playback feature that plays the first few seconds of a message before moving on to give the user an overview of the voice mail in his system. The playback options may further include an option to play urgent messages only, as well as a playback full messages option. As described previously, the ordering of conditions in each list 603 of conditions may correspond to the priority of each condition to provide a simple conflict resolution policy when an incoming call or system access request satisfies more than one condition specified in the profile. If, for example, an incoming call is received on Friday between 2 and 5 p.m. from area code 512, the ordering of conditions in list 603 of profile 601B is used in one embodiment to prioritize the area code condition over the time of day condition.

Figure 7:
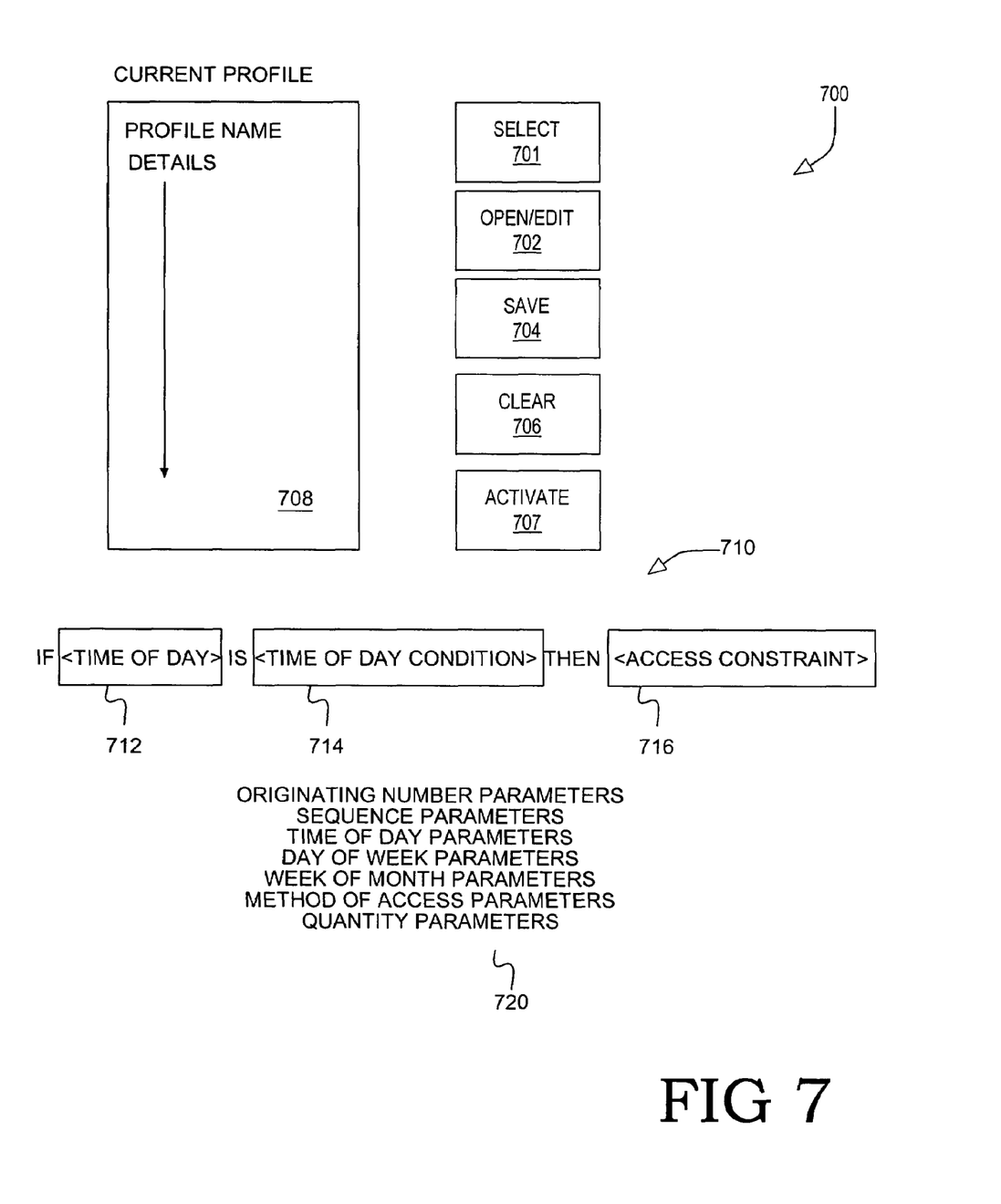
FIG. 7 illustrates selected elements of a user interface suitable for defining a voice mail profile according to one embodiment of the invention.

The present invention encompasses facilities capable of enabling users to define their own voice mail profiles and/or to enable a system administrator to define user profiles. In one embodiment, VMS 110 includes a software utility that, when executed, provides a graphical user interface that facilitates the creation of a voice mail profile. The graphical user interface may be in the form of an HTML or other type of document that is accessible with a conventional web browser. In one such embodiment, the graphical user interface code is available to at least some of the users of VMS 110 via a LAN connection to which the administration unit 210 is connected. In other embodiments, it may be desirable to restrict access to the profile definition utility to one or more system administrators, who access the utility via computer system 212 of FIG. 2. Referring now to FIG. 7, an example of selected elements of a graphical user interface (GUI) 700 suitable for creating user profiles in accordance with the present invention is depicted. In the depicted embodiment, GUI 700 includes buttons 701, 702, 704, 706, and 707. The select button 701 enables the user to select the desired profile for viewing, editing, and activation. When the select button 701 is clicked, GUI displays a list of profiles from which the user may select one. When a profile is selected, the profile conditions and corresponding actions are displayed in profile editing window 708 and are available for editing via button 702, clearing using button 706, and saving back to disk under the profile's original name or under a new name using button 704. An editing line 710 enables the user to specify a new condition and a corresponding action becomes active when the editing button 702 is clicked. Additional user buttons (not depicted) may appear on GUI 700 after the editing button is selected. These buttons would facilitate profile editing by enabling the user to insert new lines in the profile, relocate lines within the existing profile, and delete lines from the profile. Editing line 710 includes a window 712 for specifying the parameter of interest and a window 714 for specifying the condition that the selected parameter must satisfy. Window 716 is where the user specifies the action the voice mail system is to take if the specified condition is satisfied (assuming that there exists no higher priority condition that is also satisfied by a particular incoming call or access request). A list 720 of available parameters for control is shown on GUI 700. GUI 700 enables a relatively simple and intuitive method of creating voice mail profiles for use with the present invention. Other implementation may permit the creation and manipulation of user profiles using conventional phone keypad entry and/or a voice response system. The user may, for example, be able to change the selected profile easily using keypad entries during message access. Moreover, the list 720 of parameters available for control is illustrative only and the present invention is intended to encompass any parameter that the system is capable of monitoring.

In one embodiment, the invention is implemented as a method of providing voice mail services. In this embodiment, the invention includes configuring the voice mail system to enable a user of the system to define a voice mail profile that includes a set of conditions and a corresponding set of conditional actions. Each condition specifies a characteristic of an incoming call or a voice mail system access request. The voice mail system is then enabled to respond to an incoming call or voice mail system access request by determining whether the incoming call or system access request satisfies any of the conditions in the profile. The voice mail system is further enabled by the service provider to process the incoming call or system access request, in response to determining a match between a characteristic of the incoming call or system access request and a condition in the profile, by processing the incoming call or system access request according to the conditional action corresponding to the matching profile condition.

It will be apparent to those skilled in the art having the benefit of this disclosure that the present invention contemplates a profiled-based voice mail system as described. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A voice mail system, comprising:
a call processing unit to receive incoming calls and access requests;
a data storage unit to stare digital representations of audio messages on a storage medium; and
an administrative unit to enable a user to define a voice mail profile;
wherein the defined profile includes a set of voice mail conditions and a corresponding set of conditional actions, wherein each condition specifies at least one characteristic of an incoming call or system access request;
wherein the voice mail system processes a system access request or incoming call by determining whether a characteristic of the system access request or incoming call satisfies a condition included in the voice mail profile and, if so, responding to the system access request or incoming call according to the corresponding conditional action;
wherein the set of voice mail conditions includes a condition indicating whether the system access request represents the first such request of the current day.

2. The system of claim 1, wherein the set of voice mail conditions includes a condition specifying the time of day during which the system access request or incoming call is received.

3. The system of claim 1, wherein the set of voice mail conditions includes a condition specifying the day of the week during which the system access request or incoming call is received.

4. The system of claim 1, wherein the set of voice mail conditions includes a condition indicating whether at least a portion of a phone number origin of the system access request or incoming call matches a predetermined phone number portion.

5. The system of claim 4, wherein the portion of the phone number origin is further characterized as the area code of the phone number origin.

6. The system of claim 1, wherein the set of voice mail conditions includes a condition specifying the number of voice mail messages already present in a mail box of the voice mail system.

7. The system of claim 1, wherein the conditional actions are selected from a set including forwarding an incoming call to the voice mail system directly, forwarding an incoming call to another phone number, playing back messages in a summary mode by playing the first several seconds only of a message, playing back urgent messages only, and playing back full messages.

8. The system of claim 1, wherein the ordering of the set of conditions is indicative of their respective priority wherein, if multiple conditions are satisfied, the priority determines upon which condition the responding is based.

9. A voice mail service, comprising:
configuring a voice mail system to enable a user of the system to define a voice mail profile including a set of conditions and a corresponding set of conditional actions, wherein each condition specifies a characteristic of an incoming call or a voice mail system access request;

enabling the voice mail system to respond to an incoming call or voice mail system access request by determining whether the incoming call or system access request satisfies any of the conditions in the profile; and enabling the voice mail system to process the incoming call or system access request, responsive to determining a match between a characteristic of the incoming call or system access request and a condition in the profile, by processing the incoming call or system access request according to the conditional action corresponding to the matching profile condition;

wherein the set of conditions includes the time of day, the day of the week, the number of stored messages in a voice mail box of the user, and the originating phone number of an incoming call or system access request.

10. The service of claim 9, wherein configuring the voice mail system is further characterized as configuring the voice mail system to enable a user of the system to define multiple profiles and to select one of the defined profiles.

11. The method of claim 9, wherein the set of conditional actions includes forwarding an incoming call directly to voice mail, forwarding an incoming call to another number, playing back a summary of stored messages by playing the first several seconds only of a message, playing back messages in a complete mode, and playing back urgent messages selectively.

12. The service of claim 9, wherein the set of conditions are prioritized according to their order in the profile wherein the ordering determines which of two conditions satisfied by an incoming call is observed.

13. A computer program product comprising a set of computer executable instructions, stored on a computer readable medium, for providing a voice mail system, the instructions comprising:

computer code means enabling a user to define multiple voice mail profiles, each comprising a set of conditions and a corresponding set of actions, wherein each of the set of conditions correspond to a characteristic a call being processed by the voice mail system;

computer code means enabling a user to select one of the voice mail profiles;

computer code means for detecting a call to the voice mail system and for determining the characteristics associated with the call; and computer code means for determining a match between the determined characteristics of the call and the set of conditions in the selected profiles and, responsive thereto, code means for processing the call according to the action corresponding with the matching condition;

wherein each condition and corresponding action is defined as a logical expression in the profile; and wherein the set of conditions includes the time of day, the day of the week, the number of stored messages in a voice mail box of the user, and the originating phone number of an incoming call or system access request.

14. The computer program product of claim 13, wherein the set of corresponding actions includes forwarding an incoming call directly to voice mail, forwarding an incoming call to another number, playing back a summary of stored messages, playing back messages in a complete mode, and playing back urgent messages selectively.

15. The computer program product or claim 13, wherein the set of conditions in the profiles are prioritized according to their order in the profile wherein the ordering determines which of two conditions satisfied by an incoming call is observed.

16. The computer program product of claim 13, further comprising code means enabling the user to define the multiple profiles using a web browser.

* * * * *